United States Patent [19]

Leaver et al.

[11] Patent Number: 4,865,376

[45] Date of Patent: Sep. 12, 1989

[54] MECHANICAL FINGERS FOR DEXTERITY AND GRASPING

[76] Inventors: Scott O. Leaver, 850 Menlo Oaks Dr., Menlo Park, Calif. 94025; John M. McCarthy, 14 Thompson Ct., Irvine, Calif. 92715

[21] Appl. No.: 101,142

[22] Filed: Sep. 25, 1987

[51] Int. Cl.[4] .......................... B25J 15/08; B25J 18/00

[52] U.S. Cl. .................................... 294/111; 294/907; 901/15; 901/21; 901/36; 901/39

[58] Field of Search ..................... 294/86.4, 99.1, 106, 294/111, 112, 907; 74/469, 479; 414/7, 729, 730, 739; 623/57, 64, 65; 901/2, 14, 15, 21, 30–32, 34, 36–39

[56] References Cited

U.S. PATENT DOCUMENTS

| | | | |
|---|---|---|---|
| 3,261,223 | 7/1966 | Vertut | 901/21 X |
| 3,335,620 | 8/1967 | Vertut | 414/7 X |
| 3,694,021 | 9/1972 | Mullen | 294/106 |
| 3,866,966 | 2/1975 | Skinner | 294/106 |
| 4,246,661 | 1/1981 | Pinson | 901/29 X |
| 4,283,165 | 8/1981 | Vertut | 901/21 X |
| 4,351,553 | 9/1982 | Rovetta et al. | 294/111 X |
| 4,600,355 | 7/1986 | Johnson | 901/15 X |
| 4,643,473 | 2/1987 | Douglas | 294/86.4 X |

FOREIGN PATENT DOCUMENTS

| | | | |
|---|---|---|---|
| 1025646 | 6/1983 | U.S.S.R. | 294/111 |

*Primary Examiner*—Johnny D. Cherry
*Attorney, Agent, or Firm*—Woodcock Washburn Kurtz Mackiewicz & Norris

[57] ABSTRACT

Improved robotic fingers are disclosed. The present invention provides a novel three joint, two actuator robotic finger. The finger disclosed is self-contained, lighter and requires less computational overhead than designs requiring one actuator for each joint, while providing greater versatility than simple grippers. The fingers of the present invention are constructed using a series of pulleys and tendons to couple the motion of two joints. In a preferred embodiment, a novel tendon configuration is disclosed which provides human-like enclosure and grasping capabilities. Also, other useful tendon configurations are disclosed. Robotic hands comprised of a group of one or more of the fingers of the present invention and methods of utilizing them to manipulate objects are also disclosed.

1 Claim, 3 Drawing Sheets

MECHANICAL FINGERS FOR DEXTERITY AND GRASPING

FIELD OF THE INVENTION

The present invention relates in general to the field of robotics. In particular this invention relates to a novel and improved robotic finger for use in robotic end effectors for grasping and manipulating objects.

BACKGROUND OF THE INVENTION

Robotic systems, as understood in the industrial sense, generally consist of a robotic arm or manipulator capable of performing gross movements and a device known as an end effector which may either resemble a conventional machine tool or may be a separately controllable device capable of precise manipulation and/or grasping. Such robotic systems also generally include a computing system to control the articulation of the arm and end effector. A major class of end effectors generally capable of precise manipulation and/or grasping can be analogized to the human hand and, as such, usually contain controllable fingers capable of being manipulated to perform desired tasks. Preferably, these fingers should also be capable of sensing the force with which they are contacting an object and provide data for feedback control of the manipulation. This invention is directed towards an improved class of controllable robotic fingers along with optional but preferable force sensors, and the actuation, transmission and control systems for said fingers.

Although a number of finger designs exist, the class of fingers to which the present invention is directed are those designs allowing both dexterous manipulation and enclosure grasps of objects intended to be held securely by a robotic finger or in a robotic hand. Different types of robotic fingers may be distinguished by at least four features. These are: (1) the number of degrees of freedom of the finger; (2) the number of controlled actuators; (3) the type of transmission connecting the finger joints to the actuators; and (4) the method of determining the force applied by the finger.

It has now been shown that in order for a robotic finger to possess effective manipulating and grasping capabilities, it is required that the finger consist of at least three mechanical joints or links. See, The Design of a Lightweight Self-Contained Mechanical Finger, S. Leaver, 1986 p. 2, incorporated herein by reference. In prior configurations, one actuator and sensor were used to drive and control each joint of a robotic finger. See, Leaver, supra. pp. 2–7. In such configurations, the finger may be described as having three degrees of freedom and three controlled actuators. There are severe disadvantages to robotic fingers of this configuration. First, the weight of three actuators reduces the effective payload capacity of the robotic arm. Further, the control of three actuators adds to the size and complexity of the control system when the coordinated motion of one or more fingers which comprise a robotic hand is undertaken.

Previous finger designs have either sacrificed weight and control system computing resources for the sake of dexterity by increasing the number of actuators and sensors, or have achieved a lightweight finger with a simplified control algorithm which suffered from the lack of dexterity required to perform grasping motions. An example of the former design is the Utah/MIT hand while the latter type of design is embodied in the Pennsylvania Articulated Mechanical Hand (PAMH). See, S. Leaver, 1986 supra. at p. 2. Due to these shortcomings, it is apparent that the previous designs have been in need of substantial improvement.

Previous finger designs have also proved to be inadequate in terms of the type of transmission system which connects the finger joints to the actuators. Typically, finger joints have been driven by arrangements of pulleys and cables analogous to the tendons of a human finger. This type of system, as applied in previous robotic fingers, presents major disadvantages. First, the arrangements of the pulleys and tendons, as well as the exclusive reliance upon these mechanisms in the transmission system, has resulted in finger designs with an unnecessarily high degree of complexity and/or excessive weight, since individual tendons are generally attached to separate actuators. Although it is possible to reduce the weight in the vicinity of the hand by mounting the actuators at some remote location, this solution increases the mechanical complexity of the transmission system and requires special adaptations and modifications to be made to the robotic arm in order to accommodate the remote actuators.

Finger designs which utilize a screw/cam combination to manipulate one of the finger joints have also been disclosed. See, S. Leaver, supra. at p. 2. This type of finger articulation has been limited to non-grasping, two joint/two degree of freedom fingers. His design also lacks sensor means to determine the force imparted by the finger upon the object being manipulated.

If the finger joint torque can be determined by means of sensors, then finger force can possibly be controlled. The sensors can provide feedback to a tactile control system, increasing the usefulness of the finger as a manipulating and grasping device. Designs based on tendon and pulley transmission systems generally have computed joint torque by measuring tendon tension. The addition of an accurate torque measuring device can add to the transmission system compliance, or the measure of deflection the system will undergo when a static load is applied to the finger. Any successful embodiment of a tactile feedback sensing system must measure tendon tension accurately and effectively in an industrial environment, without adding a component of compliance to the transmission system which is above the desirable limits for such a system.

BRIEF DESCRIPTION OF THE DRAWINGS

The present invention will be more fully understood by reference to the accompanying drawings.

OBJECTS OF THE INVENTION

Figure 1:
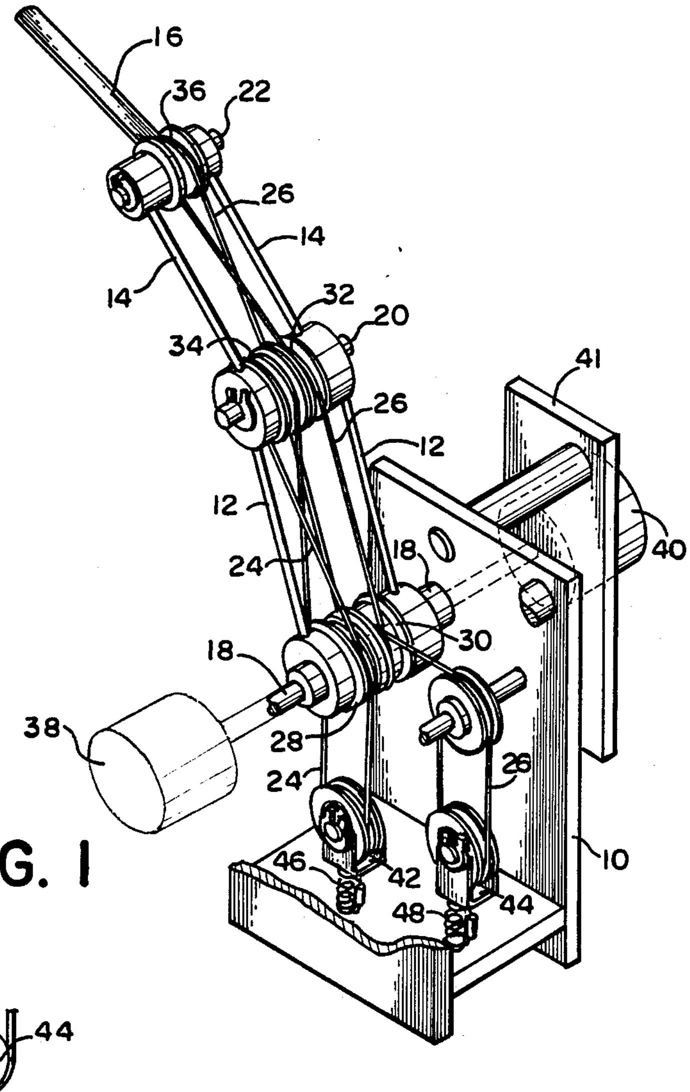
FIG. 1 is a perspective view of a typical embodiment of a robotic finger in accordance with this invention illustrating, among other things, one effective pulley section arrangement and tendon routing.

It has long been desired to provide a mechanical finger capable of manipulation and grasping which is lightweight, self-contained and minimizes the allocation of computing resources required for actuator control. It is an object of this invention to provide mechanical fingers with such advantages.

Further, it has long been desired to provide mechanical fingers which possess three joints, in order to allow effective grasping, while retaining the lightweight and less burdensome control features of two joint/two degree of freedom designs. It has now been discovered that fingers having the foregoing advantages may be constructed having three joints but requiring only two degrees of freedom and two actuators. It is thus a further object of this invention to provide a class of three joint, two degree of freedom fingers, which are reliable and capable of being assembled from available components, at low cost, by a unique and efficient arrangement of these components.

It is desirable to incorporate into the design of a robotic finger a force sensing capability and means for providing feedback to a tactile control system without raising the transmission system compliance to an unacceptably high level. It is a further object of this invention to provide such a force measurement and feedback system.

It is desirable that a robotic finger be designed in a fashion which allows one or more of the fingers to be incorporated into a robotic hand. It is a further object of this invention to provide such modular robotic fingers.

Other objects will become apparent from a review of the instant specification.

SUMMARY OF THE INVENTION

These and other objects of the present invention are achieved in accordance with this invention by providing a mechanical robotic finger having three joints, two of which are coupled such that their relative motion is not independent. In accordance with a preferred aspect of this invention the finger comprises a source of motive force and a unique system for providing power to three finger joints using only two force inputs. A set of pulleys and tendons connects the finger joints to the motive power sources in a new and efficient manner which allows the finger to encompass a range of motion including enclosure grasps. In accordance with a further preferred aspect of the present invention, a sensor means is provided to transmit feedback data which are used to determine the force applied by the finger.

This invention satisfies the need to provide a lightweight, self-contained mechanical finger which is capable of coordinated motion, including enclosure grasps. This invention further satisfies the need to provide such a finger which includes a force sensor which minimizes the computing resources required for both dexterous manipulation and feedback force control.

Thus, this invention provides a robotic finger comprising a support means from which extends an articulated member. The articulated member is comprised of three sets of connecting segments which are separated by three pin joints to permit a hinge-like motion. Each pin joint comprises at least one pulley section which is connected by tendon means to separately controllable motive force sources which are in mechanical communication with the articulated member. By connecting the tendon means to the pulley sections in accordance with the tendon routing instructions of this specification and choosing from the specified routing matrices, a device possessing three joints having two degrees of freedom which requires only two motive force sources results.

Such a finger is capable of both manipulation and grasping. Tendon routing arrangements can provide a range of motion imitating that of a human finger; other arrangements provide useful motions beyond the limits of human capabilities. All arrangements share the inherent usefulness of a three joint member and enjoy the advantages of light weight and control simplicity found in robotic fingers possessing two degrees of freedom.

This invention further provides preferred robotic finger designs which transfer motive force directly to at least one of the pulley sections of the finger thereby reducing the complexity of these particular fingers. Further, this invention provides a preferred force sensor means for adducing the rotational torque produced at the joints by any resistance to the motive force encountered. The use of one or more idler pulley sections and sensors attached to the finger base provides means for data to be transmitted and reduced to a measurement of the force imparted by the finger upon an object.

One or more of the robotic fingers to which the present invention is directed can be grouped to comprise a robotic hand. If desired, the reduced control complexity inherent in the two actuator design allows each of the fingers constructed in accordance with the present invention to be separately controllable in a cooperative fashion.

A practitioner of ordinary skill in the art will be able to construct any of the sixty-four possible three-joint, two degree of freedom robotic fingers encompassed by the present invention by selecting a matrix $[T]^{-1}$ which solves the matrix equation:

$$[A]=[Ti]^{-1}[C]$$

where [A] corresponds to the solution of the equations of motion which are encompassed by the present invention, and where [C] is a mechanical coupling matrix whose constants are determined by the relative joint motion desired.

It has been discovered that the best results are obtained where the [A] matrix is chosen as either:

$$[A]_1 = \begin{vmatrix} 1 & 0 \\ 1 & 1 \\ 1 & 1 \end{vmatrix} \text{ or } [A]_2 = \begin{vmatrix} 1 & 0 \\ -1 & 1 \\ -1 & 1 \end{vmatrix}$$

The set of $[T]^{-1}$ matrices which can be combined with [C] to produce either $[A]_1$ or $[A]_2$ has been shown to be exhausted by a set of sixty-four matrices as follows:

ROUTING MATRICES $$\begin{vmatrix} 1 & 0 & 0 \\ 1 & 1 & 0 \\ 1 & 1 & 1 \end{vmatrix} \quad \begin{vmatrix} 1 & 0 & 0 \\ 1 & 1 & 0 \\ 1 & 1 & -1 \end{vmatrix} \quad \begin{vmatrix} 1 & 0 & 0 \\ 1 & 1 & 0 \\ 1 & -1 & -1 \end{vmatrix} \quad \begin{vmatrix} 1 & 0 & 0 \\ 1 & 1 & 0 \\ 1 & -1 & 1 \end{vmatrix}$$

1 2 3 4

-continued

| ROUTING MATRICES | | | |
|---|---|---|---|
| $\begin{vmatrix} 1 & 0 & 0 \\ 1 & 1 & 0 \\ -1 & -1 & -1 \end{vmatrix}$ | $\begin{vmatrix} 1 & 0 & 0 \\ 1 & 1 & 0 \\ -1 & -1 & 1 \end{vmatrix}$ | $\begin{vmatrix} 1 & 0 & 0 \\ 1 & 1 & 0 \\ -1 & 1 & 1 \end{vmatrix}$ | $\begin{vmatrix} 1 & 0 & 0 \\ 1 & 1 & 0 \\ -1 & 1 & -1 \end{vmatrix}$ |
| 5 | 6 | 7 | 8 |
| $\begin{vmatrix} 1 & 0 & 0 \\ 1 & -1 & 0 \\ 1 & 1 & 1 \end{vmatrix}$ | $\begin{vmatrix} 1 & 0 & 0 \\ 1 & -1 & 0 \\ 1 & 1 & -1 \end{vmatrix}$ | $\begin{vmatrix} 1 & 0 & 0 \\ 1 & -1 & 0 \\ 1 & -1 & -1 \end{vmatrix}$ | $\begin{vmatrix} 1 & 0 & 0 \\ 1 & -1 & 0 \\ 1 & -1 & 1 \end{vmatrix}$ |
| 9 | 10 | 11 | 12 |
| $\begin{vmatrix} 1 & 0 & 0 \\ 1 & -1 & 0 \\ -1 & -1 & -1 \end{vmatrix}$ | $\begin{vmatrix} 1 & 0 & 0 \\ 1 & -1 & 0 \\ -1 & -1 & 1 \end{vmatrix}$ | $\begin{vmatrix} 1 & 0 & 0 \\ 1 & -1 & 0 \\ -1 & 1 & 1 \end{vmatrix}$ | $\begin{vmatrix} 1 & 0 & 0 \\ 1 & -1 & 0 \\ -1 & 1 & -1 \end{vmatrix}$ |
| 13 | 14 | 15 | 16 |
| $\begin{vmatrix} 1 & 0 & 0 \\ -1 & -1 & 0 \\ 1 & 1 & 1 \end{vmatrix}$ | $\begin{vmatrix} 1 & 0 & 0 \\ -1 & -1 & 0 \\ 1 & 1 & -1 \end{vmatrix}$ | $\begin{vmatrix} 1 & 0 & 0 \\ -1 & -1 & 0 \\ 1 & -1 & -1 \end{vmatrix}$ | $\begin{vmatrix} 1 & 0 & 0 \\ -1 & -1 & 0 \\ 1 & -1 & 1 \end{vmatrix}$ |
| 17 | 18 | 19 | 20 |
| $\begin{vmatrix} 1 & 0 & 0 \\ -1 & -1 & 0 \\ -1 & -1 & -1 \end{vmatrix}$ | $\begin{vmatrix} 1 & 0 & 0 \\ -1 & -1 & 0 \\ -1 & -1 & 1 \end{vmatrix}$ | $\begin{vmatrix} 1 & 0 & 0 \\ -1 & -1 & 0 \\ -1 & -1 & 1 \end{vmatrix}$ | $\begin{vmatrix} 1 & 0 & 0 \\ -1 & -1 & 0 \\ -1 & 1 & -1 \end{vmatrix}$ |
| 21 | 22 | 23 | 24 |
| $\begin{vmatrix} 1 & 0 & 0 \\ -1 & 1 & 0 \\ 1 & 1 & 1 \end{vmatrix}$ | $\begin{vmatrix} 1 & 0 & 0 \\ -1 & 1 & 0 \\ 1 & 1 & -1 \end{vmatrix}$ | $\begin{vmatrix} 1 & 0 & 0 \\ -1 & 1 & 0 \\ 1 & -1 & -1 \end{vmatrix}$ | $\begin{vmatrix} 1 & 0 & 0 \\ -1 & 1 & 0 \\ 1 & -1 & 1 \end{vmatrix}$ |
| 25 | 26 | 27 | 28 |
| $\begin{vmatrix} 1 & 0 & 0 \\ -1 & 1 & 0 \\ -1 & -1 & -1 \end{vmatrix}$ | $\begin{vmatrix} 1 & 0 & 0 \\ -1 & 1 & 0 \\ -1 & -1 & 1 \end{vmatrix}$ | $\begin{vmatrix} 1 & 0 & 0 \\ -1 & 1 & 0 \\ -1 & 1 & 1 \end{vmatrix}$ | $\begin{vmatrix} 1 & 0 & 0 \\ -1 & 1 & 0 \\ -1 & 1 & -1 \end{vmatrix}$ |
| 29 | 30 | 31 | 32 |
| $\begin{vmatrix} -1 & 0 & 0 \\ 1 & 1 & 0 \\ 1 & 1 & 1 \end{vmatrix}$ | $\begin{vmatrix} -1 & 0 & 0 \\ 1 & 1 & 0 \\ 1 & 1 & -1 \end{vmatrix}$ | $\begin{vmatrix} -1 & 0 & 0 \\ 1 & 1 & 0 \\ 1 & -1 & -1 \end{vmatrix}$ | $\begin{vmatrix} -1 & 0 & 0 \\ 1 & 1 & 0 \\ 1 & -1 & 1 \end{vmatrix}$ |
| 33 | 34 | 35 | 36 |
| $\begin{vmatrix} -1 & 0 & 0 \\ 1 & 1 & 0 \\ -1 & -1 & -1 \end{vmatrix}$ | $\begin{vmatrix} -1 & 0 & 0 \\ 1 & 1 & 0 \\ -1 & -1 & 1 \end{vmatrix}$ | $\begin{vmatrix} -1 & 0 & 0 \\ 1 & 1 & 0 \\ -1 & 1 & 1 \end{vmatrix}$ | $\begin{vmatrix} -1 & 0 & 0 \\ 1 & 1 & 0 \\ -1 & 1 & -1 \end{vmatrix}$ |
| 37 | 38 | 39 | 40 |
| $\begin{vmatrix} -1 & 0 & 0 \\ 1 & -1 & 0 \\ 1 & 1 & 1 \end{vmatrix}$ | $\begin{vmatrix} -1 & 0 & 0 \\ 1 & -1 & 0 \\ 1 & 1 & -1 \end{vmatrix}$ | $\begin{vmatrix} -1 & 0 & 0 \\ 1 & -1 & 0 \\ 1 & -1 & -1 \end{vmatrix}$ | $\begin{vmatrix} -1 & 0 & 0 \\ 1 & -1 & 0 \\ 1 & -1 & 1 \end{vmatrix}$ |
| 41 | 42 | 43 | 44 |
| $\begin{vmatrix} -1 & 0 & 0 \\ 1 & -1 & 0 \\ -1 & -1 & -1 \end{vmatrix}$ | $\begin{vmatrix} -1 & 0 & 0 \\ 1 & -1 & 0 \\ -1 & -1 & 1 \end{vmatrix}$ | $\begin{vmatrix} -1 & 0 & 0 \\ 1 & -1 & 0 \\ -1 & 1 & 1 \end{vmatrix}$ | $\begin{vmatrix} -1 & 0 & 0 \\ 1 & -1 & 0 \\ -1 & 1 & -1 \end{vmatrix}$ |
| 45 | 46 | 47 | 48 |

-continued

| ROUTING MATRICES | | | |
|---|---|---|---|
| $\begin{vmatrix} -1 & 0 & 0 \\ -1 & -1 & 0 \\ 1 & 1 & 1 \end{vmatrix}$ 49 | $\begin{vmatrix} -1 & 0 & 0 \\ -1 & -1 & 0 \\ 1 & 1 & -1 \end{vmatrix}$ 50 | $\begin{vmatrix} -1 & 0 & 0 \\ -1 & -1 & 0 \\ 1 & -1 & -1 \end{vmatrix}$ 51 | $\begin{vmatrix} -1 & 0 & 0 \\ -1 & -1 & 0 \\ 1 & -1 & 1 \end{vmatrix}$ 52 |
| $\begin{vmatrix} 1 & 0 & 0 \\ -1 & -1 & 0 \\ -1 & -1 & -1 \end{vmatrix}$ 53 | $\begin{vmatrix} -1 & 0 & 0 \\ -1 & -1 & 0 \\ -1 & -1 & 1 \end{vmatrix}$ 54 | $\begin{vmatrix} -1 & 0 & 0 \\ -1 & -1 & 0 \\ -1 & 1 & 1 \end{vmatrix}$ 55 | $\begin{vmatrix} -1 & 0 & 0 \\ -1 & -1 & 0 \\ -1 & 1 & -1 \end{vmatrix}$ 56 |
| $\begin{vmatrix} -1 & 0 & 0 \\ -1 & 1 & 0 \\ 1 & 1 & 1 \end{vmatrix}$ 57 | $\begin{vmatrix} -1 & 0 & 0 \\ -1 & 1 & 0 \\ 1 & 1 & -1 \end{vmatrix}$ 58 | $\begin{vmatrix} -1 & 0 & 0 \\ -1 & 1 & 0 \\ 1 & -1 & -1 \end{vmatrix}$ 59 | $\begin{vmatrix} -1 & 0 & 0 \\ -1 & 1 & 0 \\ 1 & -1 & 1 \end{vmatrix}$ 60 |
| $\begin{vmatrix} -1 & 0 & 0 \\ -1 & 1 & 0 \\ -1 & -1 & -1 \end{vmatrix}$ 61 | $\begin{vmatrix} -1 & 0 & 0 \\ -1 & 1 & 0 \\ -1 & -1 & 1 \end{vmatrix}$ 62 | $\begin{vmatrix} -1 & 0 & 0 \\ -1 & 1 & 0 \\ -1 & 1 & 1 \end{vmatrix}$ 63 | $\begin{vmatrix} -1 & 0 & 0 \\ -1 & 1 & 0 \\ -1 & 1 & -1 \end{vmatrix}$ 64 |

When either $[A]_1$ or $[A]_2$ is combined with any of the sixty-four enumerated $[T]^{-1}$ matrices, useful values of the mechanical coupling matrix [C] are obtained. It has been further discovered that certain values of [C] are particularly useful. The best values of [C] result when $[A]_1$ is combined with $[T]^{-1}$ cases 10, 12, 26, 28, 46, 48, 62 and 64, or when $[A]_2$ is combined with $[T]^{-1}$ cases 2, 4, 18, 20, 38, 40, 54 and 56. The most useful tendon routing case discovered results when $[A]_1$ is combined with $[T]^{-1}$ case 10. The resulting embodiment is illustrated in FIG. 1.

For any $[T]^{-1}$ matrix and matrix [A] selected, a unique finger design will result when one skilled in the art constructs a robotic finger generally as shown in FIG. 1 and routes the tendons by observing the tendon routing rules as follows:

CABLE ROUTING RULES FOR ROBOT RINGER TENDONS

A cable routing scheme can be obtained by following these rules. The elements of the $[T]^{-1}$ matrix, are $$[T]^{-1} = \begin{vmatrix} t1 & 0 & 0 \\ t2 & t3 & 0 \\ t4 & t5 & t6 \end{vmatrix}$$

Cable 1 routing

Between the base and joint 1 (the joint nearest the base):

If t1=−1,
then cross cable 1 between the base and joint 1.

If t1=1,
then do not cross cable 1 between the base and joint 1.

Cable 2 routing

Between the base and joint 1:

If t2=−1,
then cross cable 2 between the base and joint 1.

If t2=1,
then do not cross cable 2 between the base and joint 1.

Between joint 1 and joint 2 (the joint next removed from joint 1):

If t3=−1 and t2=1,
then cross cable 2 between joint 1 and joint 2.

If t3=−1, and t2=−1,
then do not cross cable 2 between joint 1 and joint 2

If t3=1, and t2=1,
then do not cross cable 2 between joint 1 and joint 2

If t3=1, and t2=−1,
then cross cable 2 between joint 1 and joint 2.

Cable 3 routing

Between the base and joint 1:

If t4=−1,
then cross cable 3 between the base and joint 1.

If t4=1,
then do not cross cable 3 between the base and joint 1.

Between joint 1 and joint 2:

If t5=−1, and t4=1,
then cross cable 3 between joint 1 and joint 2.

If t5=−1, and t4=−1,
then do not cross cable 3 between joint 1 and joint 2

If t5=1, and t4=1,
then do not cross cable 3 between joint 1 and joint 2

If t5=1, and t4=−1,
then cross cable 3 between joint 1 and joint 2.

Between joint 2 and joint 3 (the joint farthest from the base);

If t6=−1, and t5=1,
then cross cable 3 between joint 2 and joint 3.

If t6=−1, and t5=−1,
then do not cross cable 3 between joint 2 and joint 3

If t6=1, and t5=1,
then do not cross cable 3 between joint 2 and joint 3

If t6=1, and t5=−1, then cross cable 3 between joint 2 and joint 3.

Figure 2:
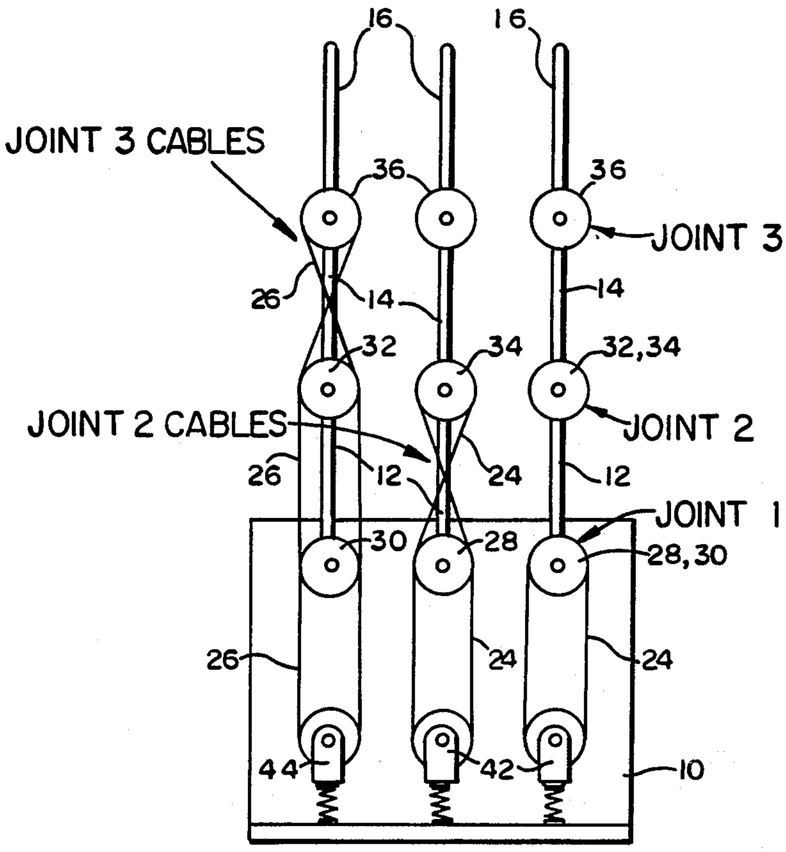
FIG. 2 is a schematic representation of the tendon routing employed in the robotic finger of FIG. 1.

For example, one skilled in the art may construct a robotic finger with tendon routing exactly as shown in FIG. 1 by selecting matrix case 10 and following the routing instructions. The tendon routing of FIG. 1 is also shown schematically in FIG. 2. By observing FIG. 1 and FIG. 2, $[T]^{-1}$ matrix case 10, and the tendon routing instructions, persons of ordinary skill in the art will understand the present invention and will be able to construct any of the fingers corresponding to the sixty-four $[T]^{-1}$ matrix cases, as applied to an [A] matrix, preferably $[A]_1$ or $[A]_2$.

Figure 3:
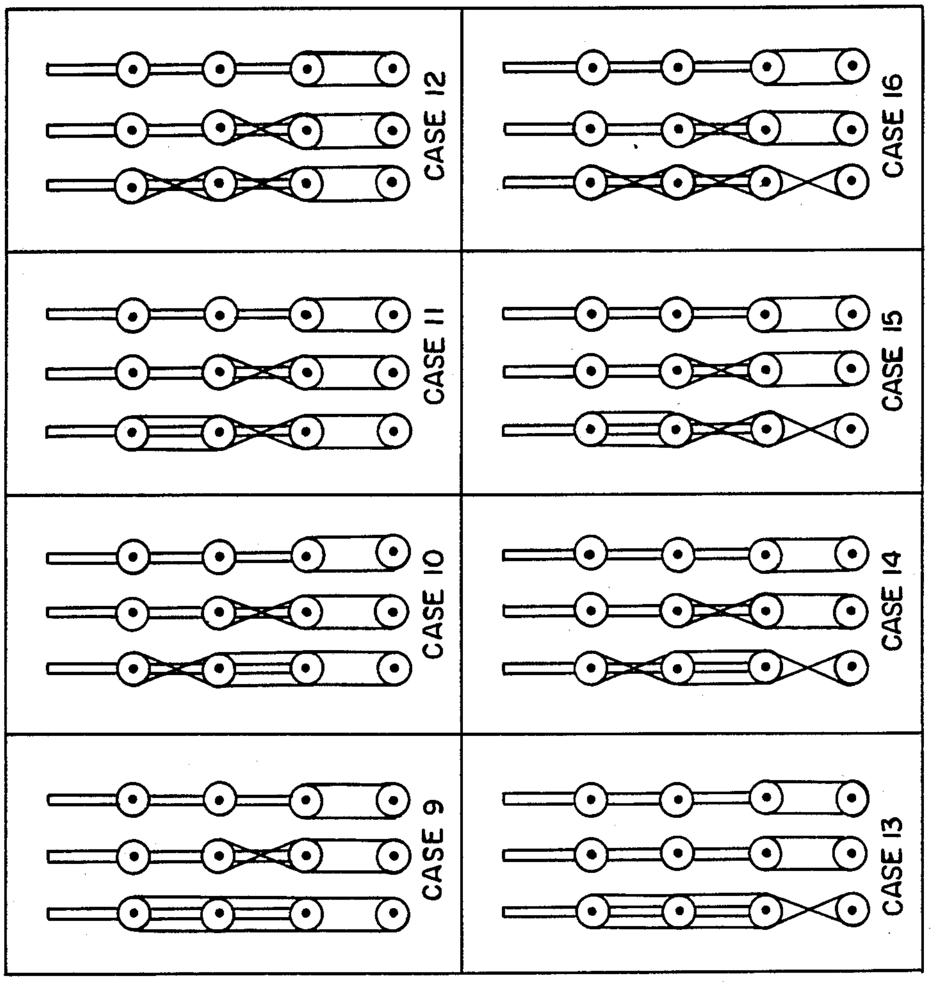
FIG. 3 presents, schematically, ten examples of the sixty-four possible tendon routing arrangements.

As further illustration, FIG. 3 shows schematically the tendon routing which would result from matrix cases 9–16 combined with one of the matrices $[A]_1$ or $[A]_2$. For example, the figure shows cases 10 and 12 combined with $[A]_1$.

A preferred embodiment of the mechanical finger embodying the principles of the present invention is illustrated in FIG. 1. In this figure, it will be seen that the finger comprises support means, 10 to which a first set of pin joints, 18, (joint 1) is attached. This set of pin joints, 18 acts as one joint since the joints are axially aligned;, however, the two joints are not connected so that they may rotate independently. Mounted on a first set of pin joints, 18 are two pulley means, 28 and 30 which are capable of independent rotation relative to one another, since the set of pin joints, 18 is not connected. Adjacent to each of the pulley means, 28 and 30 and pivotally attached to pin joint, 18 are connecting segments, 12 which are attached in a like manner to a second pin joint, 20, (joint 2). Two pulley means, 32 and 34, capable of independent rotation, turn on a shaft which forms part of the second pin joint 20. Further attached to pin joint 20 are connecting segments, 14 which terminate at a third pin joint, 22, (joint 3). A single pulley means, 36 and a third connecting rod, 16 are pivotally attached to the third pin joint, 22. Pulley means, 36 and connecting segment, 16 are constructed so as to form a rotationally integral unit. The foregoing embodiment, taken as a whole, forms a mechanical finger containing three separate pin joints, 18 (comprising a set of two joints), 20, and 22 connected by two sets of connecting segments, 12 and 14. A third connecting segment, 16 is also attached to third pin joint, 22 forming a "finger tip".

In this embodiment, two sources of motive force, 38 and 40, here, servomechanical devices, are in direct communication with each pulley means, 28 and 30, which form part of the first set of pin joints, 18. Motive force sources, 38 and 40, are attached to support means, 10 via motive force support means, 41.

In other preferred embodiments the sources of motive force 38 and 40 are not necessarily in direct communication with the first pulley means 28 and 30 and may be linked via any useful means of power transmission such as gears, pulleys, power trains and the like to provide, among other things, changes in speed, torque or rotational capability.

In the preferred embodiment of FIG. 1, the power provided by the sources of motive force 38 and 40 is transferred to the three pin joints 18, 20 and 22 via a first and second tendon means, 24 and 26. The first tendon means, 24 is connected and wrapped circumferentially about the first pulley section means, 28, which is attached to one-half of the first set of pin joints, 18. The first tendon means, 24 is then attached to one-half of a second pulley section means, 34. Over the traverse of the space separating the first pulley section means, 28 and 30, and the second pulley section means, 32 and 34, the first tendon means, 24 is crossed such that the rotational direction of pulley section means, 28 is reversed in pulley section means, 34 in a manner which maintains equal amounts of angular displacement. Any rotation of pulley section means, 28 is reproduced in the opposite rotational directional by pulley section means, 34. A second tendon means, 26 is provided to transfer power from a source of motive force, 40 which is first connected to one-half of a first pulley section means, 30, which is attached to the one-half of a first set of pin joints, 18, opposite that to which one-half of a first pulley section means, 28 is attached. After traversing the space between a first pin joint, 18 and a second pin joint, 20, it is circumferentially wrapped about one-half of a second pulley section means, 32. The principle improvement afforded by the present invention comprises the method by which the second tendon means, 26 connects second pulley section means, 32 and third pulley section means, 36. The second tendon means, 26 continues from the second pulley section means, 32 and is attached to and circumferentially wrapped around a third pulley section means, 36; during the traverse of the space between the second pulley section means, 32 and third pulley section means, 36, the second tendon means, 26 is crossed such that the rotational displacement between the second pin joint, 20 and the third pin joint, 22 is equal and opposite. By linking the second pin joint, 20 and the third pin joint, 22 in this manner, their relative motion is coupled and the two joints may be described as having one degree of freedom. The coupling provided by the tendon arrangement described provides an articulation which can be described as human-like, imitating the enclosure capability and linked motion found in a human finger.

In addition to the preferred tendon routing described, there exist a plurality of tendon routing schemes which will produce the same finger characteristics. Additionally, there are tendon routing schemes which will produce envelopes of motion which, although not human-like, are new and useful since they share the advantages of three joints coupled to provide two degrees of freedom. This class of fingers thus may be described exhaustively by the sixty-four possible tendon arrangements for each [A] matrix, especially $[A]_1$ or $[A]_2$, resulting from the matrices shown above.

The fingers of this class all share the advantages of being lightweight and requiring a reduced amount of computational capacity for control by virtue of fact that the three joints require only two sources of motive force as a result of the unique coupling between two of the joints.

Figure 1A:
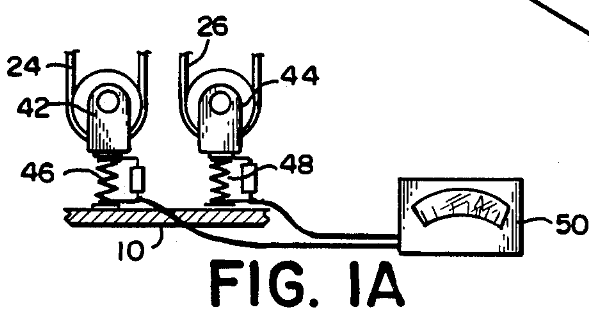
FIG. 1A is a fragmentary side view of a portion of the robotic finger of FIG. 1.

The preferred embodiment of the mechanical finger described above also includes idler pulleys, 42 and 44, which are connected to support means, 10 via spring-based force sensor means 46 and 48. The idler pulleys, 42 and 44, are in direct communication with the first tendon means, 24 and the second tendon means, 26. The arrangement as described, shown in FIG. 1A, provides a method of adducing the tension on each of the respective tendon means and transmitting tension data to a computational means, 50.

While certain embodiments have been set forth with particularity, persons of ordinary skill in the art will recognize that other embodiments may be possible employing the spirit of this invention.

What is claimed is:

1. A mechanical finger comprising:

(a) support means;

(b) an articulated member extending from the support means comprising:

(i) three sets of connecting segments;

(ii) said connecting segments being separated and connected to each other and said support means by three pin joints to permit hinge-like motion;

(iii) each of said pin joints having at least one pulley section thereupon; and (iv) tendon means connecting said pulley sections; and (c) a plurality of separately controllable motive force sources in mechanical communication with the articulated member, wherein the motive force is transferred directly to at least one of said pulley sections;

wherein a first tendon means connects a first pulley section affixed to a first pin joint and a second pulley section free to rotate about a second pin joint, said first tendon means crossing upon itself while traversing the space between a first and a second pin joint, whereby the rotation of said first pulley section will cause rotation in the opposite direction at said second pulley section; and wherein a second tendon means connects a third pulley section affixed to said first pin joint and a fourth pulley section affixed to a second pin joint, free to rotate about said second pin joint and said second tendon means connects said fourth pulley section and a fifth pulley section affixed to a third pin joint, said second tendon means crossing upon itself while traversing the space between said fourth and fifth pulley sections, whereby the rotation of said third pulley section will cause rotation in the same direction at said fourth pulley section, and the rotation of said fourth pulley section will cause rotation in the opposite direction at said fifth pulley section; said second tendon means causing the rotation of said third, fourth and fifth pulley sections, thereby coupling the rotational translation of said second and third pin joints; and whereby, said pulley sections and tendon means are connected such that the three pin joints are mechanically coupled in a manner which provides two degrees of rotational freedom.

* * * * *